United States Patent
Smith et al.

(10) Patent No.: US 9,970,527 B2
(45) Date of Patent: May 15, 2018

(54) TRANSMISSION LUBRICATION SYSTEM AND APPARATUS

(71) Applicant: EATON CORPORATION, Cleveland, OH (US)

(72) Inventors: Timothy Smith, Mattawan, MI (US); Graeme Andrew Jackson, Kalamazoo, MI (US)

(73) Assignee: EATON CORPORATION, Cleveland, OH (US)

( * ) Notice: Subject to any disclaimer, the term of this patent is extended or adjusted under 35 U.S.C. 154(b) by 994 days.

(21) Appl. No.: 14/315,434

(22) Filed: Jun. 26, 2014

(65) Prior Publication Data

US 2016/0025205 A1 Jan. 28, 2016

Related U.S. Application Data

(60) Provisional application No. 61/839,888, filed on Jun. 27, 2013.

(51) Int. Cl.
*F16H 57/04* (2010.01)

(52) U.S. Cl.
CPC ......... *F16H 57/046* (2013.01); *F16H 57/042* (2013.01); *F16H 57/0412* (2013.01); *F16H 57/0436* (2013.01); *F16H 57/0452* (2013.01)

(58) Field of Classification Search
CPC .. F16H 57/046; F16H 57/0452; F16H 57/042; F16H 57/0412
USPC ..................................................... 184/6.12
See application file for complete search history.

(56) References Cited

U.S. PATENT DOCUMENTS

| | | | | |
|---|---|---|---|---|
| 1,429,466 A | * | 9/1922 | Turnbull | B60R 17/00 184/11.1 |
| 1,974,337 A | | 9/1934 | Magnani | |
| 3,738,452 A | * | 6/1973 | Hausinger | F16H 57/0421 184/6.12 |
| 5,099,715 A | * | 3/1992 | Baiker | F16H 57/0413 184/6.12 |
| 5,299,657 A | * | 4/1994 | Hikes | F16N 7/40 184/104.1 |
| 5,341,900 A | * | 8/1994 | Hikes | F16H 57/04 184/103.2 |
| 5,522,476 A | * | 6/1996 | Holman | F16H 57/0456 184/27.1 |
| 6,189,655 B1 | * | 2/2001 | Scheib | F16H 57/0434 184/6.12 |

(Continued)

*Primary Examiner* — William E Dondero
*Assistant Examiner* — Mark K Buse
(74) *Attorney, Agent, or Firm* — RMCK Law Group PLC

(57) ABSTRACT

A manifold for distributing lubricant in a transmission includes an inlet supply nozzle for receiving transmission lubricant, and a main body in fluid communication with the supply nozzle. The main body defines a channel having open side. The manifold also includes a cover connected to the main body at the open side that creates a fluid seal along an edge of the channel. A first port extends from the main body for dispersing lubricant in a solid stream spray pattern onto traction components of the transmission. A second port extends from the main body for dispersing lubricant in a fan spray pattern onto traction components of the transmission. The manifold also includes an exhaust nozzle to discharge lubricant from the manifold for recirculation within the transmission.

16 Claims, 4 Drawing Sheets

(56) References Cited

U.S. PATENT DOCUMENTS

| | | | | |
|---|---|---|---|---|
| 6,227,333 B1* | 5/2001 | Scheib | ............... | F16H 57/0493 |
| | | | | 184/6.12 |
| 7,172,054 B2* | 2/2007 | Ruther | .................... | F01M 1/08 |
| | | | | 184/26 |
| 7,879,178 B2 | 2/2011 | Feichtenschlager et al. | | |
| 8,944,216 B2* | 2/2015 | Rollins | ............... | F16H 57/0456 |
| | | | | 184/11.2 |
| 9,212,575 B2* | 12/2015 | Kikuchi | ............. | F16H 57/0413 |
| 9,435,424 B2* | 9/2016 | Matsuda | ............. | F16H 57/0456 |
| 2006/0076193 A1* | 4/2006 | Ruther | .................... | F01M 1/08 |
| | | | | 184/6.12 |
| 2010/0018807 A1* | 1/2010 | Grenfeldt | ............ | F16H 57/0456 |
| | | | | 184/6.12 |
| 2015/0285368 A1* | 10/2015 | McLauchlan | ......... | F16H 57/046 |
| | | | | 184/6.12 |

* cited by examiner

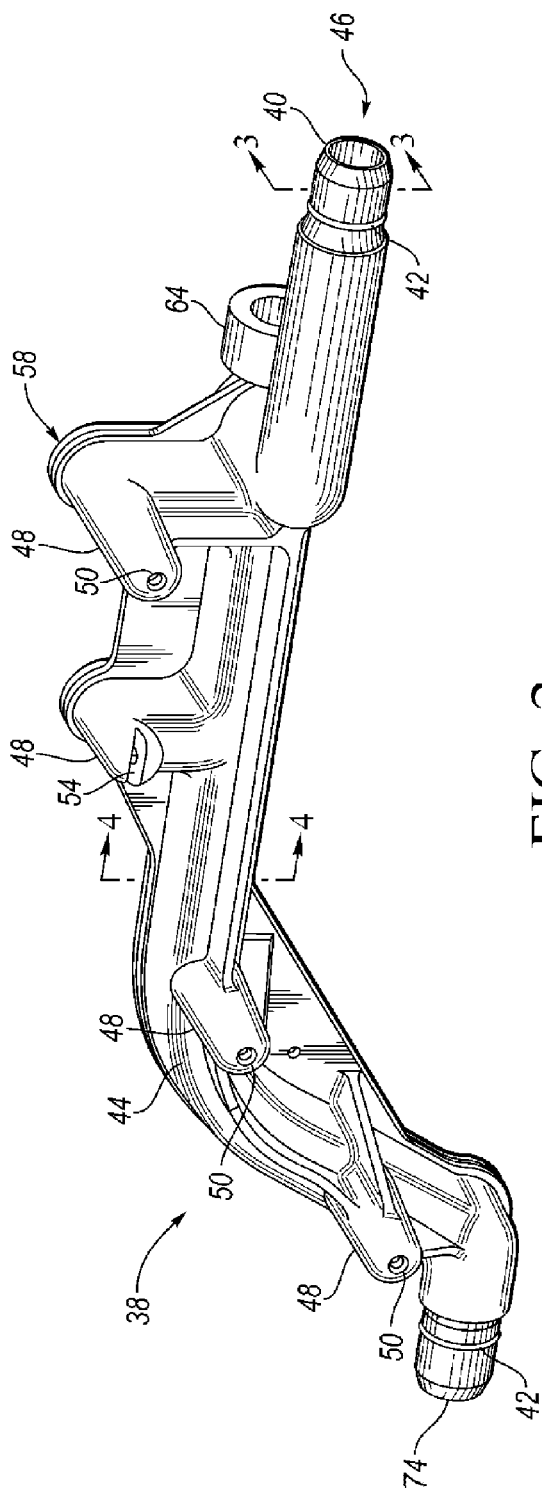
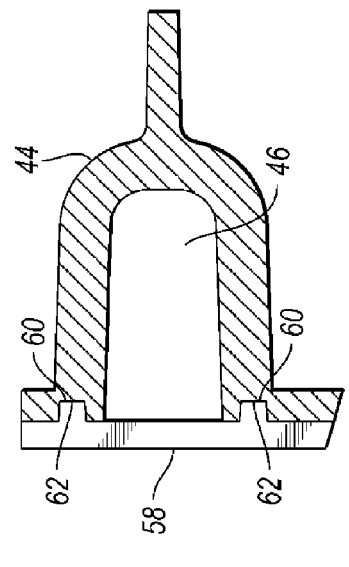
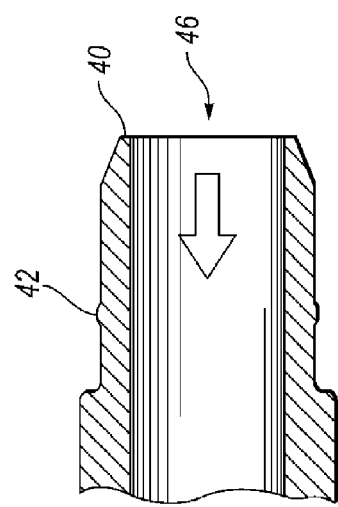
FIG. 2
FIG. 4
FIG. 3

TRANSMISSION LUBRICATION SYSTEM AND APPARATUS

CROSS-REFERENCE TO RELATED APPLICATIONS

This application claims the benefit of U.S. provisional application Ser. No. 61/839,888 filed Jun. 27, 2013, the disclosure of which is hereby incorporated in its entirety by reference herein.

TECHNICAL FIELD

The present disclosure relates to lubricant distribution for traction components of a vehicle transmission.

BACKGROUND

Transmissions, such as vehicle transmissions, have one or more gear meshes that selectively transfer torque from an input shaft to an output shaft of the transmission. The gear meshes commonly require lubrication during transmission operation. The gear meshes and lubricant may be contained within a transmission case or housing, and a sump may be provided to collect the fluid and act as a reservoir.

Lubrication systems are used to circulate lubricant and provide sufficient a quantity of filtered lubricant to all the moving parts of a transmission. Several types of lubrication systems are known. For example, a system referred to as a splash system utilizes a splasher or dipper affixed to one or more of the moving traction parts within an internal cavity of the transmission case. The moving parts are cycled through lubricant within the sump during the movement of parts and lubricant is splashed about the internal cavity of the case. The splash may be diverted using internal features of the transmission such as veins or funnels that direct the flow of lubricant as it drains. Splash systems include a high volume of lubricant and may allow lubricant to slosh within the internal cavity. One problem with splash lubrication is that it is speed dependent. There can be centrifugal effects, hydrodynamic effects, and effects from the gears working as pumps that may reduce efficiency of the transmission.

Dry lubrication systems distribute lubricant differently compared to splash systems. In dry systems, a significantly smaller volume of lubricant is contained in a sump within the transmission. The lubricant is drawn out of the sump and diverted to the traction components as required. A complex series of tubes may be assembled in a dry system where each tube has particular shapes for diverting lubricant to specific locations within the transmission. The complex tubes may be steel tubes that are formed and joined to separate nozzles. Several different tubes may be assembled to a larger central tube, or may be joined to each other by a larger over-molded body. Assembly of a large number of customized parts is often expensive and may require complex tooling.

This disclosure is directed to solving the above problem and other problems as summarized below.

SUMMARY

In at least one embodiment, a manifold for distributing lubricant in a transmission includes an inlet supply nozzle for receiving transmission lubricant. A main body is in fluid communication with the supply nozzle and defines a channel having open side along the channel. The manifold also includes a substantially flat cover connected to the main body at the open side that creates a fluid seal with the channel. The manifold further includes a plurality of outlet ports extending from the main body for dispersing lubricant from the channel across traction components of the transmission. The manifold includes an exhaust nozzle that discharges lubricant from the manifold for recirculation within the transmission.

In at least one embodiment, a manifold for distributing lubricant in a transmission includes an inlet supply nozzle for receiving transmission lubricant, and a main body in fluid communication with the supply nozzle. The main body defines a channel having open side. The manifold includes a cover connected to the main body at the open side that creates a fluid seal along an edge of the channel. A first port extends from the main body for dispersing lubricant in a solid stream spray pattern onto traction components of the transmission. A second port extends from the main body for dispersing lubricant in a fan spray pattern onto traction components of the transmission. The manifold also includes an exhaust nozzle to discharge lubricant from the manifold for recirculation within the transmission.

In at least one embodiment, a transmission lubrication distribution system includes a sump for collecting lubricant and a pump that draws lubricant from the sump. A first manifold is in fluid flow communication with the pump and includes a plurality of ports that disperse lubricant onto transmission traction components. The first manifold also includes an exhaust nozzle that discharges lubricant. A second manifold is in fluid communication with the exhaust nozzle of the first manifold and includes a plurality of ports that disperse lubricant onto transmission traction components. An exhaust nozzle of the second manifold directs lubricant to the sump for recirculation through the transmission.

The above aspects of the disclosure and other aspects will be apparent to one of ordinary skill in the art in view of the attached drawings and the following detailed description of the illustrated embodiments.

BRIEF DESCRIPTION OF THE DRAWINGS

FIG. 2 is an elevation view of a first lubricant manifold.

FIG. 3 is a cross section taken along line 3-3 of FIG. 2.

FIG. 4 is a cross section taken along line 4-4 of FIG. 2.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
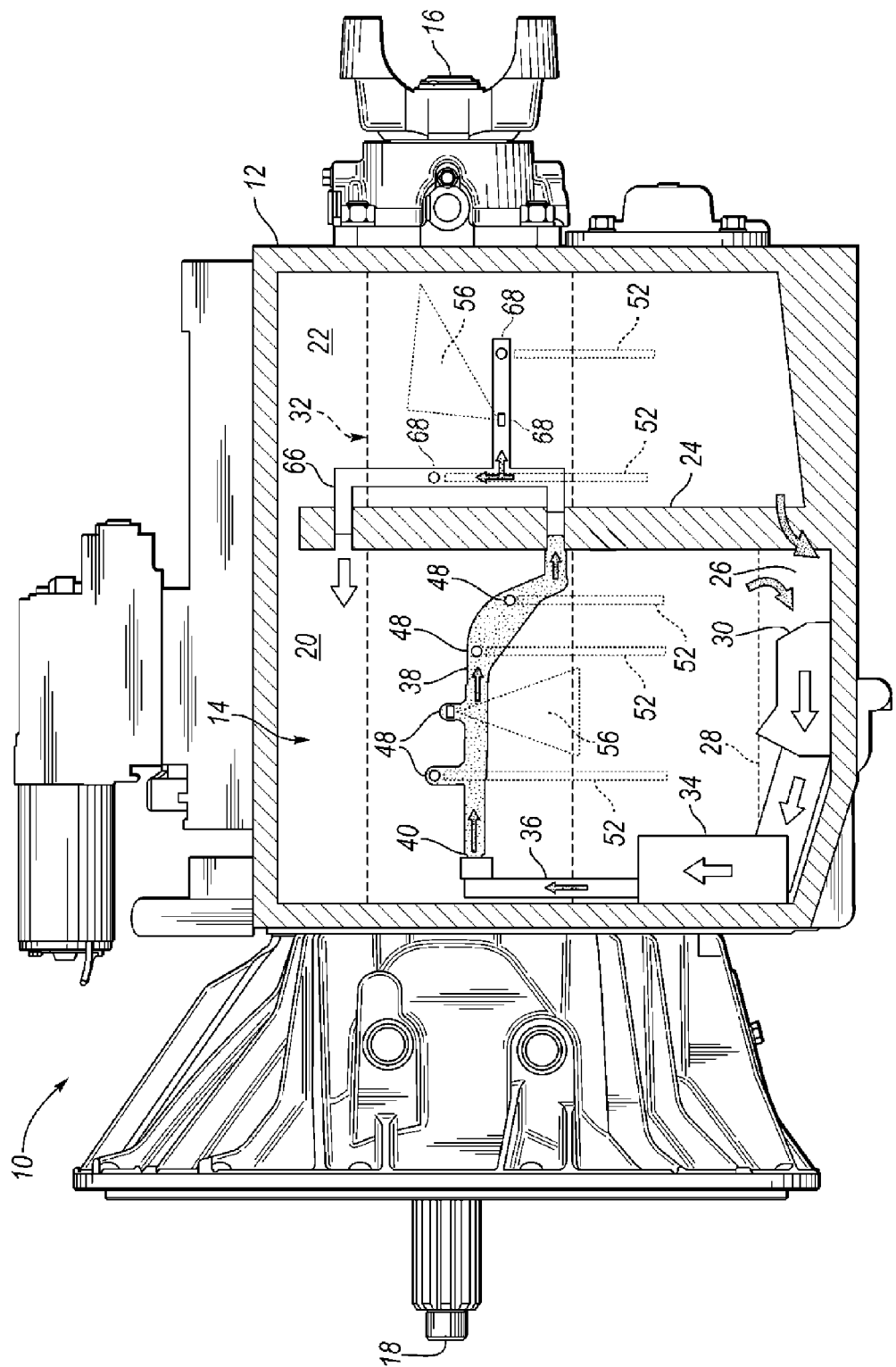
FIG. 1 is a schematic side view of a transmission lubrication distribution system.

FIG. 1 depicts a lubrication system schematic of a transmission 10. The driveline components are hidden for clarity. The transmission 10 includes an outer housing, or case 12, defining an internal cavity 14 that contains components of the transmission 10. The case 12 may be made from one or more castings, forgings, or other parts. The transmission 10 receives input torque from an engine connection 18, and delivers output torque at the driveline connection 16. The case 12 encloses a gear train having a plurality of traction components that are adjustable to vary the ratios of both the speed and the torque of the output relative to the input. For example, the gear train may comprise meshed gears and/or planetary gear sets. The transmission 10 may also be connected to an auxiliary transmission to provide a wider ratio adjustment. The internal working components of the transmission 10 require sufficient lubrication to maintain efficient operation, reduce drag, and prevent excessive heat build-up.

According to an aspect of the present disclosure, a dry sump lubrication system is used to efficiently distribute transmission lubricant through the transmission 10. The dry sump configuration reduces drag losses caused by lubricant splash associated with a higher lubricant volume splash lubrication system. The internal cavity 14 defines a first section 20 and a second section 22, divided by a mid-wall 24. The first section 20 defines a sump 26, or reservoir, at a low point for collecting the lubricant. The maximum fill line 28 of the lubricant is lower than a maximum fill line of a splash type system because the moving components of the transmission 10 do not need to be substantially immersed in fluid. For example, in a dry lubrication system according to the present disclosure about twelve quarts of lubricant may be collected in the sump beneath the gear train traction components.

The lubrication system within the transmission case 12 is used to distribute the fluid lubricant from the sump 26. More efficient operation of the transmission is achieved by directing fluid lubricant to transmission traction components, generally housed in the region indicated by reference numeral 32. Active distribution of the fluid reduces the overall volume required to attain sufficient lubrication. The lubrication system is pressure driven and includes a strainer 30 and a pump 34. The pump 34 creates pressure and draws lubricant from the sump 26. A filter may be positioned near the intake of the pump 34 to restrict foreign particles from being cycled through the lubrication system. The lubrication system also may include a pressure regulator near an exhaust port of the pump 34 that opens when pressure in the system attains a predetermined value, for example, in the case of the filter clogging. Lubricant is forced through a supply tube 36 by the pump 34. The supply tube 36 is in fluid flow communication with a first manifold 38 that is arranged to distribute lubricant to the various transmission traction components 32.

Referring to FIGS. 2 and 3, the first manifold 38 includes a inlet supply nozzle 40 to receive lubricant from the supply tube 36. At least one annular retaining rib 42 is integrally formed about the inlet supply nozzle 40 to create the fluid seal between the supply tube 36 and the first manifold 38. The integral annular retaining ribs 42 extend radially outward from the outer circumference of the inlet supply nozzle 40 and interfere with an inner surface of the supply tube 36. An exhaust nozzle 74 expels undispersed lubricant from the first manifold. The exhaust nozzle 74 may also include one or more integrally formed annular retaining ribs 42. Annular protrusions at the exhaust nozzle 74 may create a fluid seal to a circulation component arranged to direct the lubricant back to the sump 26 for recirculation. A separate assembled seal may not be required at either the inlet supply nozzle 40 or the exhaust nozzle 74. Alternatively, a lip or a fin may similarly be integrally formed into the manifold 38 to create a fluid seal.

Referring to FIGS. 2 and 4, the first manifold 38 also includes a main body portion 44 extending from the inlet supply nozzle 40. The main body 44 is generally elongate and defines an internal channel 46. Based on the relative placement of the individual traction components within the transmission 10, lubricant may need to be distributed in a transverse direction relative to the length of the main body 44. A plurality of outlet ports 48 extends laterally from the main body 44 to disperse lubricant as it flows through the first manifold 38. The outlet ports 48 are positioned at specific locations along the length of the main body 44 to direct a desired amount of lubricant towards specific components. The first manifold 38 is arranged generally to exhaust lubricant from the outlet ports 48 at an upper portion of the internal cavity 14 of the case 12. Gravity causes the lubricant to drain downwardly across the internal traction components of the transmission 10. The plurality of ports may be integrally formed with the main body as a single unitary member.

Referring to the schematic of FIG. 1, as well as FIG. 2, the outlet ports 48 of the first manifold 38 may have different types of configurations. The outlet ports 48 may define a simple orifice 50 that direct the lubricant exiting the manifold 38 in a solid stream spray pattern 52. Alternatively, the outlet ports 48 may have an elongate orifice 54 that directs the lubricant exiting the manifold 38 in a fan spray pattern 56 to provide a wider lubricant coverage area. Hollow cone spray patterns, solid cone spray patterns, and/or asymmetric variants of the above patterns may also be suitable to target internal components of the transmission 10 to provide a desired amount of lubricant. The plurality of ports may include a combination of different orifice types to output each of a solid stream spray pattern and a fan spray pattern. More specifically, a fan spray pattern may be more suitable to target a synchronizer traction component of the transmission 10 that requires broad coverage lubrication. A solid stream pattern may be more suitably targeted to specific locations along the gear mesh traction components within the transmission 10.

The first manifold 38 may be formed as an injection molded plastic manifold that integrates several geometric features into a single component. However, forming complex bends and formations requires an expensive injection molding tool having multiple components and articulating slides to create features that are not aligned with the main direction of die movement. The main body 44 of the manifold 38 may be formed with a channel that has an open side along the length to reduce tooling costs and complexity. Including an open sided channel allows the main body 44 of the manifold 38 to be an open body having features integrally formed in the main direction of die movement.

Figure 5:
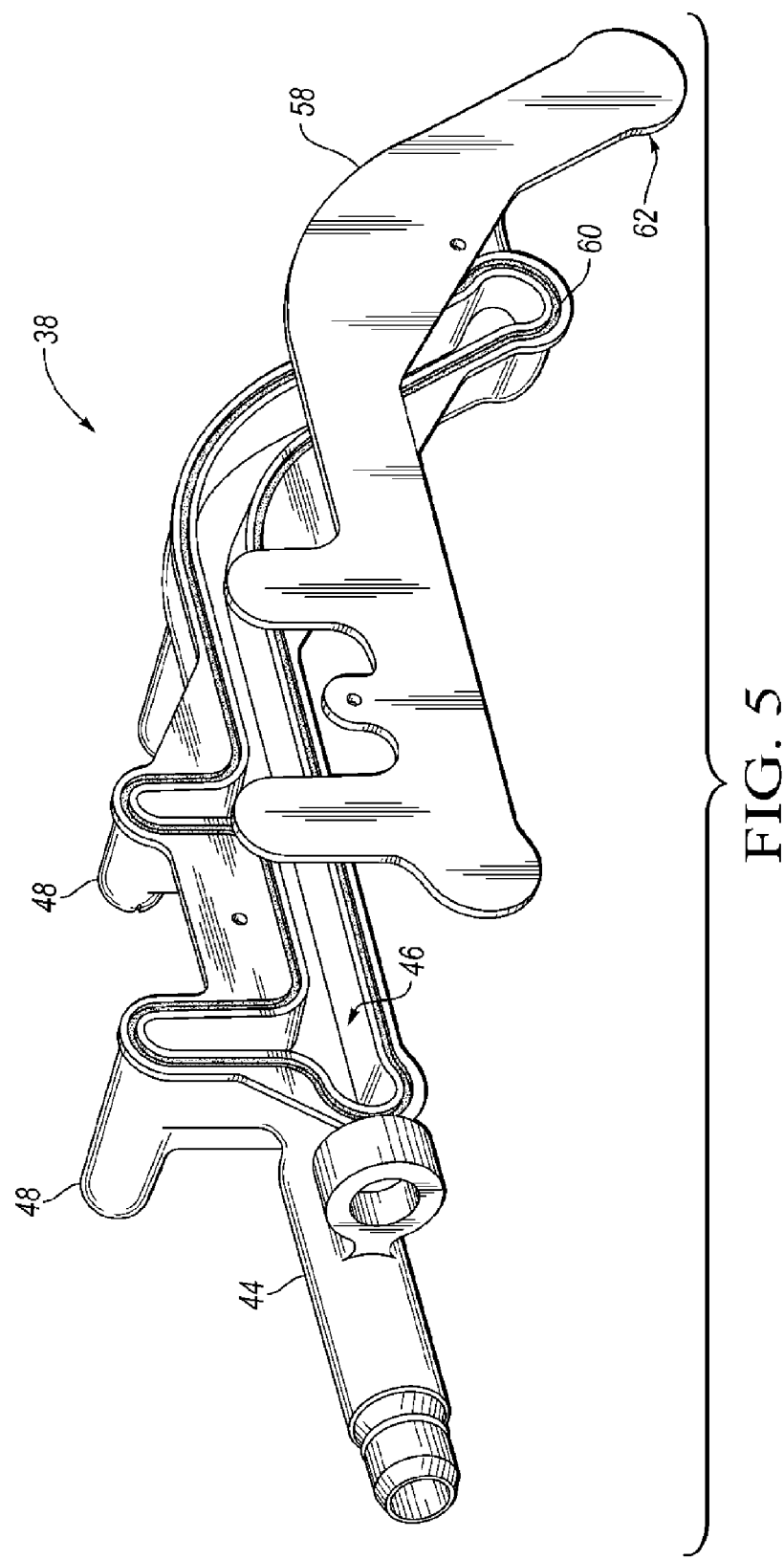
FIG. 5 is an exploded perspective view of the first lubricant manifold of FIG. 2.

Referring to FIGS. 4 and 5, a substantially flat cover 58 is provided that cooperates with the main body 44 to enclose the internal channel 46 and create a fluid seal. The simple shape of cover 58 is conducive to injection molding and reduces tooling costs. Both of the main body 44 and the cover 58 may be formed in a single injection molding tool having multiple mold cavities.

The main body 44 also defines a groove 60 along each of an opposing pair of edges on either side of the internal channel 46. The groove 60 defines a continuous path around the perimeter of the open side of the internal channel 46. The groove 60 receives a corresponding rib 62 disposed on the cover 58. The rib 62 nests in the corresponding shape of groove 60 to provide contact with multiple surfaces along a continuous path around the perimeter of the internal channel 46. The rib 62 creates a fluid seal when inserted into the groove 60. The cover 58 may be affixed to the main body 44 by adhesion, laser welding, or vibration friction welding to create a sealed seam joint between the cover 58 and the main body 44. In a preferred embodiment, the cover 58 is joined by vibration friction welding. In alternative configurations, a recessed shoulder may be provided on each opposing side of the internal channel for receiving the cover.

Mounting features 64 may be integrally molded into at least one of the main body 44 or the cover 58. The manifold 38 may be attached to corresponding features on an inner portion of the case 12 of the transmission.

Under extreme conditions, operating temperatures of the lubricant within the transmission may exceed 100 degrees Celsius. The manifold must be configured to maintain stiffness and dimensional stability at high operating temperatures. The manifold may injection molded from a resilient elastomer such as Polyamide 46. The elastomer preferably includes a predetermined volume of embedded glass fibers. In one example, the manifold 38 may have a wall thickness of about 2.5 mm.

Referring back to FIG. 1, the first section 20 and the second section 22 of the internal cavity 14 of the transmission are substantially separated by the mid-wall 24. The first section 20 includes the sump 26 that collects lubricant that drains to the bottom of the internal cavity 14. It may be desirable to limit the size of the sump and keep the second section 22 dryer than the first section 20 by retaining little or no fluid at the bottom of the second section 22. In this way, fluid sloshing due to vehicle and traction component movement may be reduced.

A second manifold 66 may be used in conjunction with the first manifold 38 to provide a comprehensive transmission lubrication system. In at least one embodiment, a first manifold and a second manifold are in series fluid flow communication to separately lubricate traction components within the first section 20 and the second section 22, respectively. The first and second manifolds 38, 66 may be fluidly connected to each other at the mid-wall 24 to distribute lubricant from one to the other. It may be desirable to arrange the first manifold 38 and the second manifold 66 in different orientations depending on the layout of the internal components within the transmission 10. The first manifold 38 may be elongate and oriented in a generally horizontal direction. The second manifold 66 may be elongate and oriented in a generally vertical direction.

Figure 6:
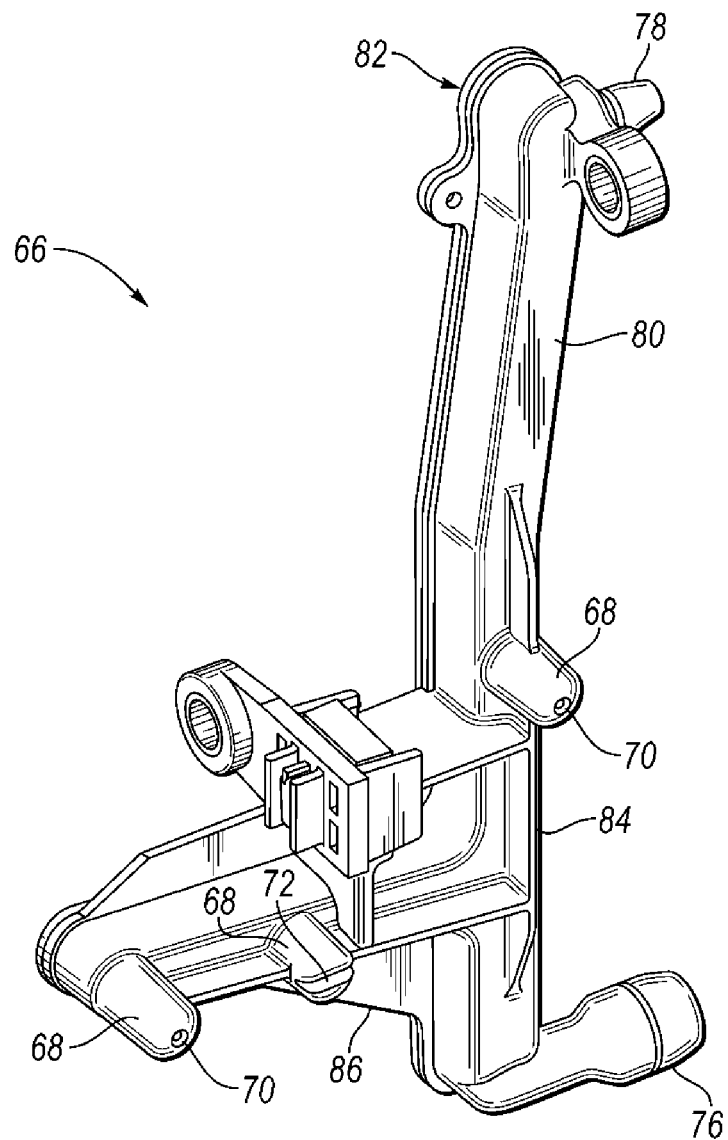
FIG. 6 is a perspective view of a second lubricant manifold.

Referring to FIG. 6, the second manifold 66 includes a plurality of ports 68 that are arranged to distribute lubricant to respective transmission components. The second manifold 66 is also provided with multiple orifice types to disperse lubricant in different patterns as best suited to particular traction components of the transmission 10. The ports 68 may define a combination of simple orifices 70 to divert the lubricant from the manifold 66 in a solid stream spray pattern 52. An elongate orifice 72 may be used to divert the lubricant from it the manifold 66 in a fan spray pattern 56 to provide a wider lubricant coverage area.

The second manifold 66 may also be constructed as a main body 80 joined to a cover 82. Similar to the first manifold discussed above, the cover 82 provides a fluid seal and encloses an internal channel to contain lubricant as it flows through the second manifold 66. The main body 80 is formed by injection molding to facilitate including various stiffening ribs 82 and gussets 84 that enhance the overall rigidity of the manifold.

The two manifolds cooperate to provide lubricant recirculation through the transmission. The exhaust nozzle 74 of the first manifold expels lubricant cycled through the manifold that is not dispersed from one of the outlet ports 48. The exhaust nozzle 74 is in fluid flow communication with a supply nozzle 76 of the second manifold 66 at a pass-through portion of the mid-wall 24. The second manifold 66 also includes a corresponding exhaust nozzle 78 that expels lubricant not dispersed by the ports 68. However in the case of the second manifold 66, the lubricant is expelled to return back to the sump 26 for circulation. The exhaust nozzle 78 is directs lubricant through a pass-through portion of the mid-wall 24 to the first section 20 to drain back to the sump 26. In alternative configurations, the second manifold 66 may exhaust to a lubricant cooling system external to the transmission 10 prior to being directed back to the sump 26. Lubricant may be directed through the cooling system before dispersion across the traction components of the transmission 10 to aid in preventing excessive heat build-up.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A manifold for distributing lubricant in a transmission comprising:
    an inlet supply nozzle for receiving transmission lubricant, the inlet supply nozzle arranged at a first terminal end of the manifold and having a first retaining rib that extends radially outwardly from an outer circumferential surface of the inlet supply nozzle;
    a main body in fluid communication with the supply nozzle and defining a channel having open side along the channel;
    a substantially flat cover connected to the main body at the open side that creates a fluid seal with the channel, wherein the cover is affixed to the main body by one of adhesion welding, laser welding, or vibration welding;
    a plurality of outlet ports extending from the main body for dispersing lubricant from the channel across traction components of the transmission; and
    an exhaust nozzle that discharges lubricant from the manifold for recirculation within the transmission, the exhaust nozzle arranged at a second terminal end of the manifold and having a second retaining rib that extends radially outwardly from an outer circumferential surface of the exhaust nozzle.

2. The manifold of claim 1 wherein the plurality of outlet ports includes a combination of different orifice types including a solid stream spray pattern orifice and a fan spray pattern orifice.

3. The manifold of claim 1 wherein the main body defines a groove at each of an opposing pair of edges along the open side to receive the cover, and wherein the cover includes a rib that creates the fluid seal when joined to the groove.

4. The manifold of claim 1 wherein the first retaining rib creates a fluid seal with a supply tube and wherein the second retaining rib creates a fluid seal with a circulation component of the transmission.

5. The manifold of claim 1 wherein the manifold is mounted to disperse lubricant at an upper portion of an internal cavity of a transmission to allow the lubricant to flow downwardly across the traction components towards a sump.

6. The manifold of claim 1 wherein the main body and the cover are molded from a polyamide plastic.

7. A manifold for distributing lubricant in a transmission comprising:
- an inlet supply nozzle for receiving transmission lubricant, the inlet supply nozzle arranged at a first terminal end of the manifold and having a first retaining rib that extends radially outwardly from an outer circumferential surface of the inlet supply nozzle;
- a main body in fluid communication with the supply nozzle and defining a channel having open side;
- a cover connected to the main body at the open side that creates a fluid seal along an edge of the channel, wherein the cover is affixed to the main body by one of adhesion welding, laser welding, or vibration welding;
- a first port extending from the main body for dispersing lubricant in a solid stream spray pattern onto traction components of the transmission;
- a second port extending from the main body for dispersing lubricant in a fan spray pattern onto traction components of the transmission; and
- an exhaust nozzle to discharge lubricant from the manifold for recirculation within the transmission, the exhaust nozzle arranged at a second terminal end of the manifold and having a second retaining rib that extends radially outwardly from an outer circumferential surface of the exhaust nozzle.

8. The manifold of claim 7 wherein the main body defines a groove at each of an opposing pair of edges along the open side to receive the cover, and wherein the cover includes a rib that creates the fluid seal upon insertion into the groove.

9. The manifold of claim 7 wherein the first port and the second port are integrally formed with the main body as a single unitary member.

10. The manifold of claim 7 wherein the manifold is mounted to disperse lubricant at an upper portion of an internal cavity of a transmission to allow the lubricant to flow downwardly across the traction components towards a sump.

11. The manifold of claim 7 further comprising a mounting feature integrally formed with the main body to secure the manifold to an inner portion of a transmission case.

12. A transmission lubrication distribution system comprising:
- a sump for collecting lubricant;
- a pump that draws lubricant from the sump;
- a first manifold in fluid flow communication with the pump that includes a plurality of ports that disperse lubricant onto transmission traction components, the first manifold having an inlet supply nozzle arranged at a first terminal end that receives lubricant and an exhaust nozzle arranged at a second terminal end that discharges lubricant into a mid-wall of the transmission; and
- a second manifold in fluid communication with the exhaust nozzle of the first manifold at the mid-wall and that includes a plurality of ports that disperse lubricant onto transmission traction components and an exhaust nozzle that directs lubricant to the sump for recirculation.

13. The transmission lubrication distribution system of claim 12 wherein the each of the first manifold and the second manifold includes a combination of different orifice types including a solid stream spray pattern orifice and a fan spray pattern orifice.

14. The transmission lubrication distribution system of claim 12 wherein the first manifold is elongate and arranged in a generally horizontal orientation, and wherein the second manifold is elongate and arranged in a generally vertical orientation.

15. The transmission lubrication distribution system of claim 12 wherein lubricant directed from the exhaust nozzle of the second manifold cycles through a cooling system prior to being received at the sump for recirculation.

16. The transmission lubrication distribution system of claim 12 wherein the exhaust nozzle of the first manifold defines an annular rib that creates a fluid seal at a connection to the second manifold.

* * * * *